United States Patent [19]

Langen et al.

[11] Patent Number: 4,992,021
[45] Date of Patent: Feb. 12, 1991

[54] SIDE CHANNEL BLOWER

[75] Inventors: Herbert Langen, Altbach; Peter Steiner, Aichwald; Helmut Keinert, Nürtingen, all of Fed. Rep. of Germany

[73] Assignee: J. Eberspächer, Esslingen, Fed. Rep. of Germany

[21] Appl. No.: 439,456

[22] Filed: Nov. 20, 1989

[30] Foreign Application Priority Data

Nov. 23, 1988 [DE] Fed. Rep. of Germany ....... 3839430

[51] Int. Cl.$^5$ .......................... F04D 23/00; F01N 3/02; F01N 3/30
[52] U.S. Cl. ..................... 415/52.1; 415/13; 415/144; 60/311; 55/302
[58] Field of Search ............ 415/52.1, 13, 17, 47, 415/121.2, 144, 145, 146, 20, 28; 60/311; 55/302, 523, DIG. 3

[56] References Cited

U.S. PATENT DOCUMENTS

| | | | |
|---|---|---|---|
| 3,356,034 | 12/1967 | Knowles et al. | 415/20 |
| 3,382,809 | 5/1968 | Bookout et al. | 415/17 |
| 3,486,458 | 12/1969 | Tyler | 415/28 |
| 3,736,074 | 5/1973 | Kilbane et al. | 415/121.2 |
| 3,937,015 | 2/1976 | Akado et al. | 55/523 |
| 4,325,163 | 4/1982 | Mattson et al. | 415/121.2 |
| 4,373,330 | 2/1983 | Stark | 60/311 |
| 4,516,990 | 5/1985 | Erdmannsdörfer et al. | 55/523 |
| 4,848,083 | 7/1989 | Goerlich | 60/311 |

Primary Examiner—Edward K. Look
Assistant Examiner—Hoang Nguyen
Attorney, Agent, or Firm—McGlew and Tuttle

[57] ABSTRACT

A side channel blower, preferably for burners for cleaning soot particle filters mounted in exhaust gas lines of vehicles by burning off, is shown, in which a chamber housing (6) with a chamber (5) is arranged on the air discharge side, wherein air flows into said chamber from the side channel blower (1) and said chamber permits adjustable return of air from said chamber into the annular channel (8) via a bypass (12, 13) and return of additional air, also into said annular channel (2), via an air transfer channel (9) that can be closed with a valve (16), and the air delivered can be fed from said chamber to the filters for cleaning by burning off via two air discharge openings (8a, 8b), which can be closed such that one discharge opening is open and the other discharge opening is closed.

6 Claims, 2 Drawing Sheets

SIDE CHANNEL BLOWER

FIELD OF THE INVENTION

The present invention pertains to a side channel blower serving as a combustion air blower for engine-independent, liquid fuel-fired burners for cleaning soot filters by burning off.

BACKGROUND OF THE INVENTION

In connection with the cleaning of the exhaust gases of vehicle engines operated with diesel fuel, e.g., of engines used to drive construction equipment, it is necessary to remove the soot particles from the exhaust gas. Removal of the soot particles by filtration has proved to be a particularly suitable cleaning method. According to this method, the exhaust gas is introduced into one or several filter elements, e.g., filter cartridges; the soot particles are retained on the surface of the filter during the passage of the exhaust gas through the filter and are deposited there. This exhaust gas cleaning by filtration requires the removal of the soot particles accumulated at certain intervals. It would be possible to do this by removing and collecting the soot particles, but this would require removal of the filter at regular intervals and removal of the soot accumulated according to accumulated according to another method. Consequently, this method is unsuitable for vehicles, e.g., trucks or passenger cars.

Cleaning by burn-off, i.e., burning off of the soot particles accumulated, has proved to be a better method. If this cleaning method is used, two groups of filters are preferably arranged in parallel to one another. Exhaust gas flows through one of the groups to filter the exhaust gas, while the other group is being regenerated by burning off the soot particles. To achieve this, a burner, e.g., preferably a burner known in connection with engine-independent heaters, is arranged on the intake side of the filter. To regenerate the filter, the necessary temperature is produced to start the burning off process, and the temperature can be reduced after burning off has started. In the case of engine-independent heaters, this happens in the prior-art devices by speed control of the side channel blower used as a combustion air blower. However, this regulation of the blower speed is rather complicated and expensive, because it requires additional compensating resistors, which leads to a significant loss of energy over the resistors and requires special heat dissipation.

A side channel blower for delivering supplementary air into the exhaust gas system of a motor vehicle equipped with a spark ignition engine to reduce the pollutant emissions, comprising an air intake opening and a forced air outlet opening of the side channel blower with a bypass channel between the suction side and the delivery side, is known from U.S. Pat. Specification No. 3,356,034 of 1967. In this prior-art side channel blower, the flow cross section of the bypass channel can be adjusted with a slide. The more widely the slide is opened, the larger is the amount of air returned to the suction side and the lower is inherently the output of the side channel blower. However, this side channel blower has the disadvantage that the amounts delivered and the pressure setting depend on the speed of the drive engine.

SUMMARY AND OBJECTS OF THE INVENTION

It is an object of the present invention to provide a side channel blower with d.c. drive, whose delivery can be changed from a maximum to a predetermined value by simple means, without changing the engine speed. The arrangement being particularly provided for use with at least two filters connected in parallel with one being regenerated by burning off while the other or others is (are) being used as a soot particle filter, comprising an air intake port, an air discharge opening, as well as a bypass regulator with return of the air not withdrawn into the side channel annular space.

This task is achieved with a side channel blower as discussed above by arranging a chamber housing with a chamber on the air discharge side of the side channel blower, wherein the chamber has two air discharge openings that can each be closed by a valve, as well as an opening for transferring air from the chamber into the annular space, which opening can also be closed by a valve.

This design according to the present invention leads to a device in which a bypass can be opened or closed with a valve, so that one bypass, arranged in the known manner, is used to adjust the delivery of the side channel blower into the chamber and the amount of air to be withdrawn from the chamber can be adjusted, if necessary, with the other bypass, which can be opened and closed. This arrangement is particularly advantageous for the said cleaning of soot particle filters by burning off, because after the burn-off process has been started, the amount of the combustion air will be reduced, e.g., to half. However, this arrangement is also advantageous for engine-independent heaters, because it can be used to reduce the heat output step wise. The two air discharge openings, which can be closed separately, as well as the bypass, which can also be closed separately, make it possible to reduce the amount of combustion air in several steps, so that a broad range of regulation is available with a simple mechanical operation.

According to a variant of the present invention, the two valves associated with the air discharge openings are connected to each other such that on of the valves is opened and the other valve is closed. If the side channel blower is used to clean soot particle filters by burning off, this design offers the advantage that if two filters, e.g., filter cartridges, are arranged in parallel, one filter can be cleaned by burning off deposits during continuous operation of the vehicle, while the other filter is cleaning the exhaust gas. It is also possible to arrange a plurality of filters that are able to perform rotary movement, regenerating on of them while the other is performing the filtration, and the other or others can be brought into the operating position by rotating the device, so that a filtration or burn-off reserve is available for special cases.

Another advantageous embodiment is characterized in that the valve closing the air passage opening (the second bypass) closes or opens the air passage opening as a function of the amount of air flowing through the air discharge opening that is currently open. While all three valves have only one "open" or "closed" position in the simplest case this improved variant makes it possible to vary continuously the amount of air that can be discharged through the open air discharge opening. According to another embodiment, these valves can also be controlled as a function of the temperature in the combustion chamber following the air discharge opening. Solenoid valves have proved to be particularly suitable valves. According to another embodiment, the chamber is detachably connected to the side channel blower, so that it is possible to install chambers of different size and with different air discharge openings, corresponding to the intended use.

Accordingly, it is an object of the invention to provide a side channel blower as a combustion air blower for an engine-independent, liquid fuel-fired burner device used for cleaning soot filters by burning off soot accumulated, at least two of the soot filters are connected in parallel such that one may be regenerated by burning off accumulated soot while the other soot filter is being used as a soot particle filter. The side channel blower according to the invention includes a side channel blower housing defining a side channel annular space, an air intake port, and an air discharge opening. The side channel blower housing includes a bypass regulator for return of air not withdrawn into the side channel annular space. A chamber housing is provided defining a delivery chamber. The chamber housing is positioned adjacent the side channel blower housing. The air discharge opening communicates with the chamber. The chamber includes a first air discharge opening and second air discharge opening and an air passage opening leading to the side channel annular space. Valve means is provided for selectively individually opening and closing the first opening, the second opening and the air passage opening for changing the blower delivery without changing the blower speed.

Still a further object of the invention is to provide a side channel blower, specifically for use as a combustion air blower for engine-independent, liquid fuel-fired burner devices for cleaning soot filters by burning off accumulated soot, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
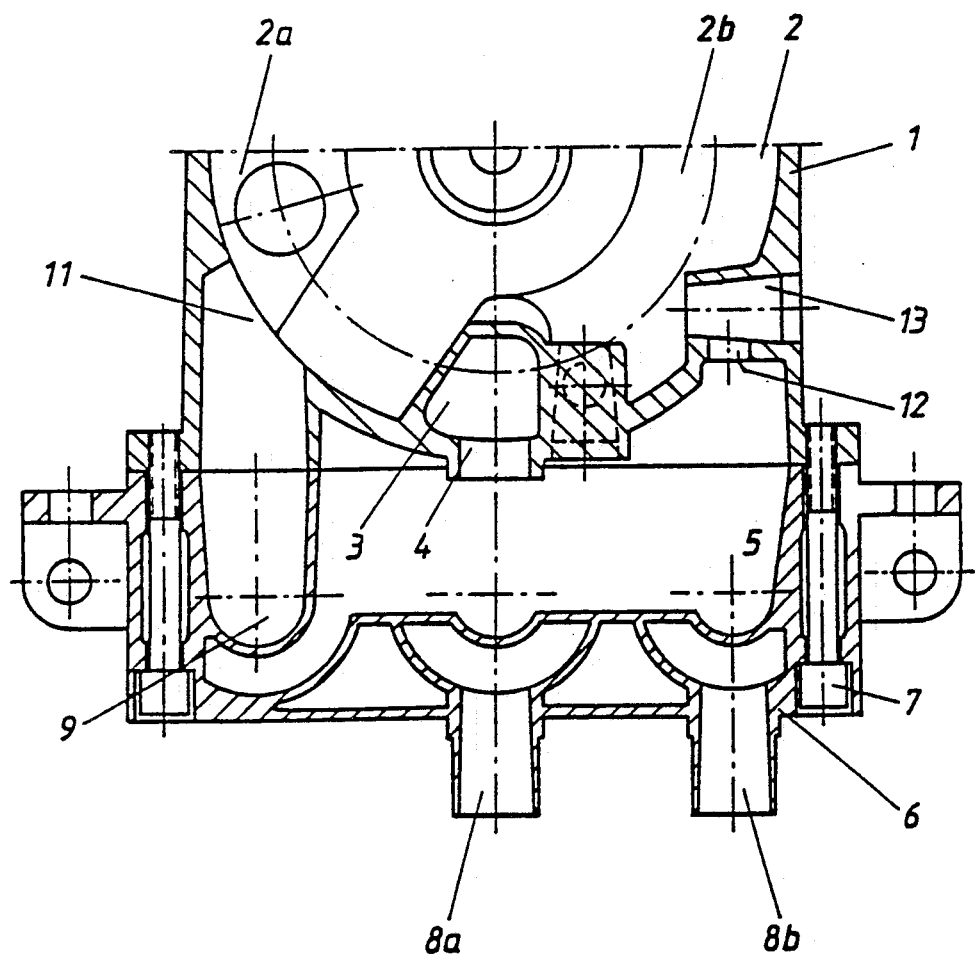
FIG. 1 is a sectional view showing part of the side channel blower with a chamber.

FIG. 1 shows half of a side channel blower 1 that is designed according to the present invention. This side channel blower 1 has an annular channel 2 with a suction side 2a and a delivery side 2b. The air drawn in, delivered, and compressed to the predetermined pressure, flows out of the side channel blower via air discharge pipe 4 through the air discharge opening 3 and enters chamber 5 in the chamber housing 6, which is connected to said side channel blower 1 by a screw connection 7. The air delivered flows from the chamber housing 6 via the air discharge openings 8a, 8b to the filter cartridges to be cleaned. An air transfer channel 9 with the air passage opening 10 is also arranged in the chamber housing 6; via the air passage opening 10, an adjustable percentage of the air being delivered can be returned according to the present invention to the suction side of the annular channel 2 via the air intake opening 11.

A conical bore 13 leading to the annular channel 2 is provided in the housing in the side channel blower 1, through which bore the air delivery is regulated by means of an adjusting cone (not shown) by returning a predetermined percentage of the air delivered from the chamber 5 via a bypass channel 12. This air is returned from the chamber 5, which is filled from the suction side 2a of said annular channel 2, over a short distance to the delivery side 2b. As is shown by broken lines, this bypass with the conical bypass bore may also be arranged in the immediate vicinity of the air discharge opening 4 of said annular channel 2. This is possible because the volume control can be set before mounting of the chamber housing 6. As is apparent from FIG. 3, which shows a top view of the chamber housing represented in FIG. 1, a total of three valves—in this embodiment the solenoid valves 14, 15, and 16—are arranged on said chamber housing 6. Valves 14 and 15 are used to close the air discharge openings 8a and 8b at the points 8a' and 8b', and valve 16 is used to close the air transfer channel 9.

Figure 2:
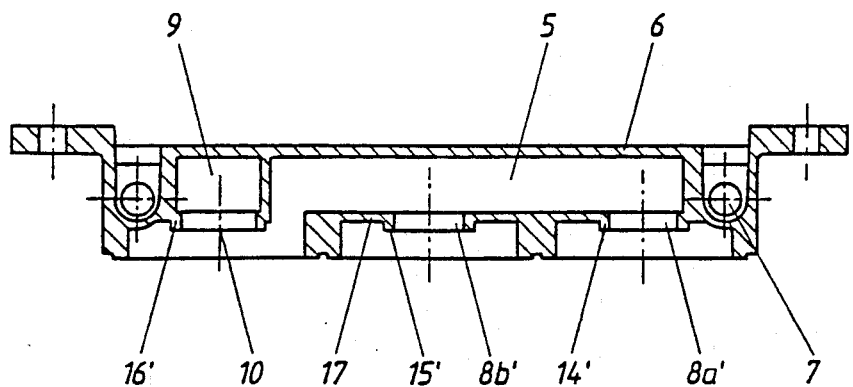
FIG. 2 is a sectional view of the chamber B taken in the direction of line III—III.
Figure 3:
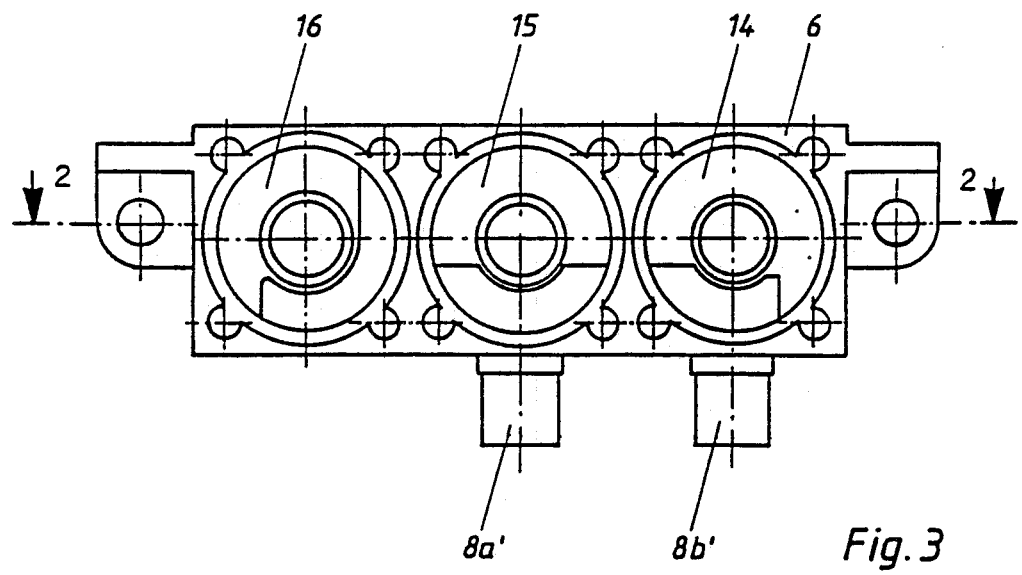
FIG. 3 is a top view of the chamber installed with mounted valves.

FIG. 2, which is a section along line III—III of FIG. 3, shows the passage of air and the shape of chamber 5, as well as the valve seats 14', 15', and 16'. These are mounted in a wall 17 at openings 8a', 8b' to the air discharge openings 8a, 8b, and at the passage opening 10 to the air transfer channel 9.

Valves 14, 15, and 16 may also be designed as pneumatic valves. Valves 14 and 15 are controlled electrically or pneumatically in the known manner such that one valve is open and the other is closed.

The side channel blower designed according to the present invention makes it possible to change the delivery of a side channel blower with d.c. drive in one step from a maximum to a fixed value by opening an additional bypass channel 9 via shut-off member 16.

While a specific embodiment of the invention has been shown and described in detail to illustrate the application of the principles of the invention, it will be understood that the invention may be embodied otherwise without departing from such principles.

What is claimed is:

1. A side channel combustion air blower for an engine-independent, liquid fuel-fired burner device for cleaning soot filters by burning off soot, with at least two soot filters being connected in parallel such that one soot filter may be regenerated by burning off soot while another or other soot filters are being used as a soot particle filter, comprising:

a side channel blower housing defining a side channel annular space, and air intake port and a side channel blower air discharge opening, said side channel blower housing including a bypass regulator for return of air not withdrawn into the side channel annular space;

a chamber housing defining a chamber, said chamber housing being positioned adjacent said side channel blower housing, said side channel blower air discharge opening communicating with said chamber, said chamber having a first air discharge opening and a second air discharge opening and an air passage opening leading to said side channel annular space;

and, valve means for selectively individually opening and closing said first opening, said second opening and said air passage opening for changing the blower delivery without changing the blower speed.

2. A side channel blower according to claim one, wherein said valve means includes two valves associated with said first air discharge opening and said second air discharge opening, said valves being connected to one another such that one of said valves is opened and the other valve is closed.

3. A side channel blower according to claim one, wherein said valve means includes a valve associated with said air passage opening, said valve associated with said air passage opening closing or opening depending upon the amount of air which is to flow through said first and second air discharge openings.

4. A side channel blower according to claim one, wherein said valve means includes a valve associated with said air passage opening, said valve associated with said air passage opening, opening or closing depending upon the temperature in a combustion chamber located down stream of said first and second air discharge openings.

5. A side channel blower according to claim one wherein said valve means includes a first valve associated with said first air discharge opening, a second valve associated with said second discharge opening and a third valve associated with said air passage opening, each of said valves being solenoid valves.

6. A side channel blower according to claim one, wherein said chamber housing is detachably connected to said side channel blower housing.

* * * * *